May 6, 1969  J. G. PORTERFIELD ET AL  3,442,262

THERMAL DEFOLIATOR

Filed July 28, 1967  Sheet 2 of 2

INVENTORS.
JAY G. PORTERFIELD
DAVID G. BATCHELDER
BY
Head & Johnson
ATTORNEYS

United States Patent Office 3,442,262
Patented May 6, 1969

3,442,262
THERMAL DEFOLIATOR
Jay G. Porterfield and David G. Batchelder, Stillwater, Okla., assignors to Oklahoma State University, Stillwater, Okla., a corporation of Oklahoma
Filed July 28, 1967, Ser. No. 656,909
Int. Cl. F23c 5/00
U.S. Cl. 126—271.2         7 Claims

ABSTRACT OF THE DISCLOSURE

This invention relates to a defoliator for defoliating and desiccating crops. The invention includes a mobile structure including means of propulsion over crop lands. A shroud is carried by the mobile structure, the shroud being closed at the top, sides, and ends with an open bottom, the sides and ends terminating adjacent the ground and the forward and rearward ends having doors therein to admit and exit upstanding crops as the shroud is moved by the mobile structure over the ground. A heat producing means is mounted within the shroud whereby the air temperature therein is raised. A recirculating fan within the shroud moves the air past the heat producing means into contact with the crops. The device functions to defoliate and/or desiccate crops, such as cotton, to cause the leaves to die, shrivel and fall off to augment subsequent harvesting of the crops.

SUMMARY OF THE INVENTION

It has been learned that the production and harvesting of some agricultural crops can be improved by thermal applications. The invention described herein is for the specific purpose of subjecting crops to an increased temperature environment for a short length of time. Such increased temperature is useful to kill the fragile portions of plants, such as the leaves, to effect defoliation and/or desiccation. Defoliation is particularly useful in cotton plants, since it has been shown that cotton which has been defoliated is easier and more efficiently harvested by mechanical means. In addition the use of short duration increased temperature environments for the control of insects, parasites and diseases shows encouraging results.

The machine of this invention may be self-propelled or pulled by a tractor and may be adapted for single or multiple row treatment. The duration of treatment is controlled by only two factors, that is, the length of the treating zone and the speed of travel. The best way to control treating time for a particular machine is by varying the speed of travel.

It has been found that defoliation and/or desiccation results from a combination of exposure time and temperature and, as would be expected, these factors are complementary to each other, that is, increased temperature means that a shorter exposure time is required which, in turn, means that the machine may travel faster. On the other hand, a lower treatment temperature means that the longer treating period is required and that the machine must travel slower. The range of treatment temperatures varies according to the plant being treated and the purpose of treatment, but normally the treatment temperature varies between approximately 300° F. and approximately 600° F. Lower than 300° F. requires treatment periods of such long duration as to make treatment uneconomical and treatment temperatures above 600° F. are undesirable because of the increased fire hazard. As an example, tests of one machine have shown that a speed of 2.7 miles per hour, which produced a two second exposure to row crops, produced 80 percent defoliation at a temperature of 450° F. Traveling at the same speed but with a temperature of 500° F. produced 90 percent defoliation while at 400° F. and the same speed approximately 70 percent defoliation was effected.

This invention provides improved means of recirculating air in the treating zone of a thermal applicator for most effective utilization and control of heat.

DESCRIPTION OF THE VIEWS

DETAILED DESCRIPTION

Figure 1:
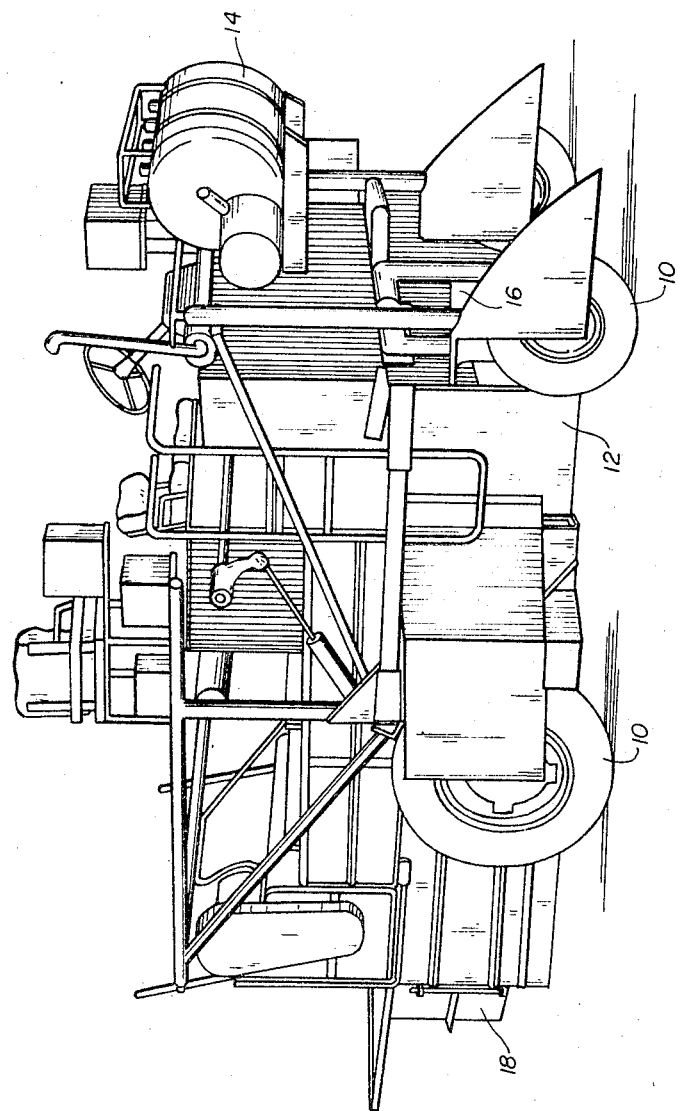
FIGURE 1 is an isometric view of a typical device embodying the principles of this invention providing a dual crop row thermal defoliator.

Referring to the drawings, and first to FIGURE 1, a thermal defoliator according to this invention is shown. The defoliator is a mobile structure having wheels 10 as a means of propulsion over crop land. The defoliator may be self-propelled, as shown in FIGURE 1, or tractor drawn. The defoliator includes a shroud 12 which provides a treating zone wherein upstanding crops, such as cotton, peanuts, sorghum or the like, may be subjected to an increased temperature environment for a short duration.

The machine of FIGURE 1 includes a fuel reservoir 14 for storing fuel utilized to provide heat within the device. Such fuel may consist of kerosene, gasoline, or any such combustible fuel. Liquefied petroleum gas has proven to be economical and particularly adaptable for the purpose. The same fuel may be utilized for propulsion. Plants enter shroud 12 through inlet doors 16 and exit through outlet doors 18 as the machine is moved along crop rows.

Figure 2:
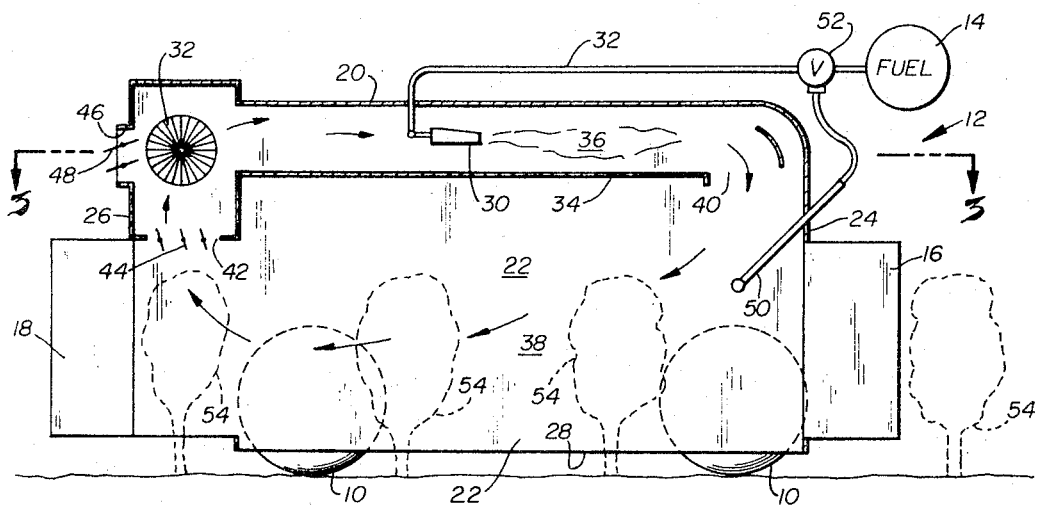
FIGURE 2 is a cross-sectional view taken in a vertical plane of a defoliator machine according to this invention showing only the basic elements thereof.
Figure 3:
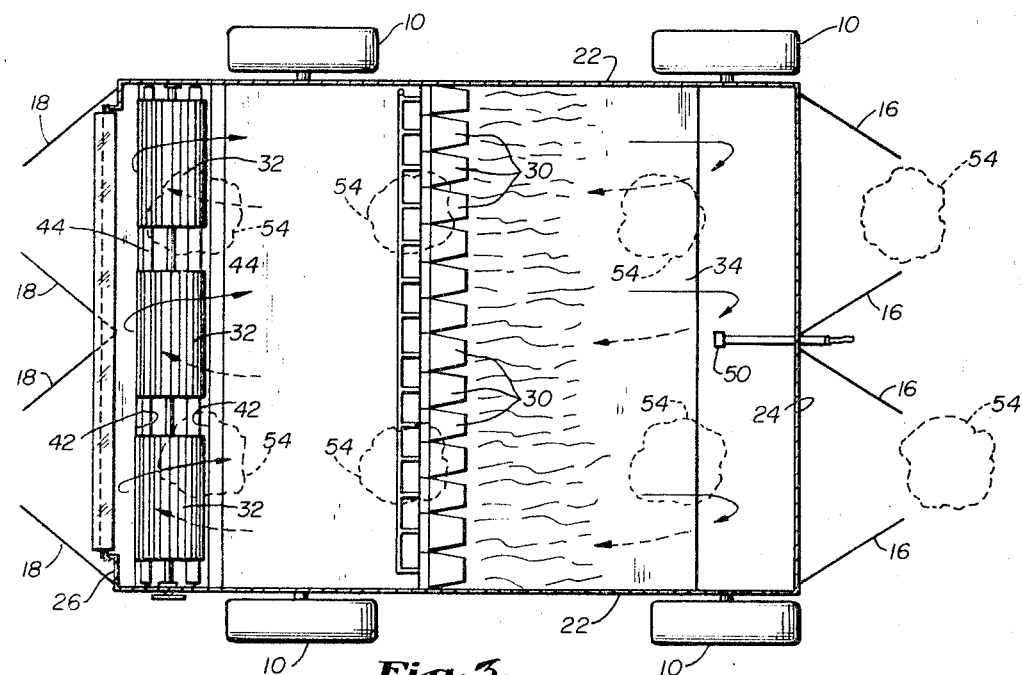
FIGURE 3 is a cross-sectional view taken in a horizontal plane of a defoliator machine according to this invention showing the basic features.

Referring to FIGURES 2 and 3, the details of the basic concept of the invention are best shown. The shroud generally indicated by the numeral 12 includes a closed top 20, sides 22, a forward end 24 and a rearward end 26. The shroud 12 is opened at the bottom with the bottom edges 28 of the sides 22 and ends 24 and 26 terminating near the ground.

The inlet doors 16 are formed in the forward end 24 and outlet doors 18 in the rearward end 26. Doors 16 and 18 are adjustable so that the width of opening can be regulated to permit the entrance and exit of upstanding crops with a minimum of clearance to avoid unnecessary loss of heated air within the shroud.

A heater 30 is positioned within the interior of the shroud and in the preferred embodiment consists of a burner or burners supplied from fuel tank 14 by means of fuel line 32. In order to achieve good heat distribution within the interior of the shroud a number of burners 30 are preferred, such as shown in FIGURE 3.

Also positioned within the shroud is a recirculating fan 32 which moves air past burners 30 and into contact with upstanding plants within the shroud.

In the preferred embodiment, as best shown in FIGURE 2, a horizontal partition 34 is provided extending between the sides 22. Partition 34 divides the interior of shroud 12 into an upper heating zone 36 and a lower treating zone 38. Partition 34 includes a forward discharge opening 40 whereby air flows out of the upper heating zone 36 into the lower treating zone 38, and a rearward air inlet opening 42 whereby air is drawn from the treating zone 38 into the heating zone 36.

Positioned in opening 42 is a louver means 44 whereby the flow of air from the treating zone 38 into the heating zone 36 may be controlled. It can be seen that a similar louver means may be positioned in the forward air discharge opening 40 or, if preferred, a louver may be placed in both discharge openings 40 and inlet openings 42.

A make-up air opening 46 is provided in the rearward end 26 of the shroud, the opening being adjacent the recirculating fan 32. Positioned within opening 46 is a louver means 48 by which the amount of make-up air flowing from the exterior of the shroud into the upper heating zone 36 is controlled.

It can be seen that by controlling louvers 44 and 48 in coordination with each other, the proportion of recirculated and make-up air passing through the heating zone 36 may be selected and controlled so that most efficient combustion and temperature regulation is attained.

A temperature probe 50 extends within the treating zone 38 to control the temperature within the zone. The temperature may be controlled in a variety of ways. The illustrated arrangement in FIGURE 2 incldues regulating the flow of fuel by a control valve 52 in fuel line 32, the valve 52 being responsive to the temperature detected by probe 50. In addition it can be seen that probe 50 may be utilized to control the actuation of louvers 44 and 48 by a servo arrangement to regulate the temperature within the treating zone 38, or in the most sophisticated arrangement the probe 50 can be simultaneously utilized for controlling fuel to burners 30 plus controlling louvers 44 and 48.

Plants 54 are shown as they would appear passing through the defoliator. As the plants pass through the treating zone 38 the increased air temperature rapidly raises the temperature of the thin components thereof, that is, the leaves and foliage, so that in a short time, such as one to two seconds, the leaves are killed. After the leaves are killed by the thermal defoliator they subsequently die and shrivel and a large percent falls off the plants so as to be a reduced hindrance in the subsequent harvesting of the plants. It has been learned that effective defoliation of cotton by thermal means can be accomplished without impairing in any detectable way the quality of the cotton crop subsequently harvested.

While the invention has been described with a certain degree of particularity, it is manifest that many changes may be made in the details of construction and the arrangement of components without departing from the spirit and scope of this disclosure. It is understood that the invention is not limited by the abstract or the summary herein, nor the illustrated embodiments which are shown for purposes of exemplification of the invention, but the invention is to be limited only to the scope of the appended claim or claims, including the full equivalency to which each element thereof is entitled.

What is claimed:

1. A thermal defoliator for defoliating and/or desiccating crops comprising:
   a mobile structure having means of propulsion over crop land;
   a shroud carried by said mobile structure, said shroud having sides and a forward and rearward end, said shroud being closed at the top and open at the bottom, the bottom edge of the sides and ends thereof terminating adjacent the ground, said shroud having a width and height to receive at least one row of crops to be treated therein;
   an inlet door in the lower portion of said shroud forward end whereby upstanding crops enter said shroud as said mobile structure is moved along;
   an outlet door in the lower portion of said shroud rearward end whereby upstanding crops exit said shroud;
   a heat producing means in said shroud whereby the air temperature within said shroud may be raised;
   a recirculating fan within said shroud moving air therein past said heat producing means and into contact with crops within said shroud; and
   means within said shroud of detecting the air temperature and means responsive to said temperature detecting means for controlling said heat producing means whereby the air temperature within said shroud may be maintained within a preselected range.

2. A thermal defoliator according to claim 1 including a horizontal partition within said shroud spaced from the top thereof dividing the interior of said shroud into an upper heating zone and a lower treating zone, wherein crops entering said shroud pass through said treating zone and wherein said heat producing means is positioned within said upper heating zone and wherein said recirculating fan moves air through said heating zone, down into said treating zone and back up through said heating zone.

3. A thermal defoliator according to claim 2 including louver means in the path of air moved by said recirculating fan whereby the quantity of air recirculated may be controlled.

4. A thermal defoliator according to claim 2 including an opening in said shroud communicating the heating zone therein with the exterior of said shroud whereby air is drawn from the exterior of said shroud into said heating zone and including controllable louver means in said opening whereby the amount of air drawn into said heating zone may be regulated.

5. A thermal defoliator for defoliating and/or desiccating crops comprising:
   a mobile structure having means of propulsion over crop land;
   a shroud carried by said mobile structure, said shroud having sides and a forward and rearward end, said shroud being closed at the top and open at the bottom, the bottom edge of the sides and ends thereof terminating adjacent the ground, said shroud having a width and height to receive at least one row of crops to be treated therein;
   an inlet door in the lower portion of said shroud forward end whereby upstanding crops enter said shroud as said mobile structure is moved along;
   an outlet door in the lower portion of said shroud rearward end whereby upstanding crops exit said shroud;
   a heat producing means in said shroud whereby the air temperature within said shroud may be raised;
   a recirculating fan within said shroud moving air therein past said heat producing means and into contact with crops within said shroud; and
   a horizontal partition within said shroud spaced from the top thereof dividing the interior of said shroud into an upper heating zone and a lower treating zone, wherein crops entering said shroud pass through said treating zone and wherein said heat producing means is positioned within said upper heating zone and wherein said recirculating fan moves air through said heating zone, down into said treating zone and back up through said heating zone.

6. A thermal defoliator according to claim 5 including louver means in the path of air moved by said recirculating fan whereby the quantity of air recirculated may be controlled.

7. A thermal defoliator according to claim 5 including an opening in said shroud communicating the heating zone therein with the exterior of said shroud whereby air is drawn from the exterior of said shroud into said heating zone and including controllable louver means in said opening whereby the amount of air drawn into said heating zone may be regulated.

References Cited

UNITED STATES PATENTS

| | | |
|---|---|---|
| 419,559 | 1/1890 | Rice. |
| 1,062,655 | 5/1913 | Macleod. |
| 1,899,704 | 2/1933 | Lutz. |
| 2,190,175 | 2/1940 | Roche. |
| 2,682,728 | 7/1954 | Nisbet et al. |

CHARLES J. MYHRE, *Primary Examiner.*